(12) United States Patent
Gibson et al.

(10) Patent No.: US 6,343,236 B1
(45) Date of Patent: Jan. 29, 2002

(54) METHOD AND SYSTEM FOR ANALYZING FAULT LOG DATA FOR DIAGNOSTICS

(75) Inventors: David Richard Gibson, North East, PA (US); Nicholas Edward Roddy; Anil Varma, both of Clifton Park, NY (US)

(73) Assignee: General Electric Company

( * ) Notice: Subject to any disclaimer, the term of this patent is extended or adjusted under 35 U.S.C. 154(b) by 0 days.

(21) Appl. No.: 09/285,611

(22) Filed: Apr. 2, 1999

(51) Int. Cl.[7] .............................. G05B 9/02; G06F 19/00
(52) U.S. Cl. ........................ 700/79; 700/110; 700/177; 714/2; 714/26
(58) Field of Search .............................. 700/78, 79, 21, 700/110, 174, 177; 714/2, 20, 25, 26

(56) References Cited

U.S. PATENT DOCUMENTS

| | | | |
|---|---|---|---|
| 4,521,847 A | * 6/1985 | Ziehm et al. | 364/184 |
| 5,023,817 A | * 6/1991 | Au et al. | 364/550 |
| 5,127,005 A | 6/1992 | Oda et al. | 371/183.02 |
| 5,445,347 A | * 8/1995 | Ng | 246/169 R |
| 5,463,768 A | 10/1995 | Cuddihy et al. | 395/183.13 |
| 5,596,712 A | * 1/1997 | Tsuyama et al. | 395/183.02 |
| 5,799,148 A | 8/1998 | Cuddihy et al. | 395/183.02 |
| 5,845,272 A | 12/1998 | Morjaria et al. | 706/50 |
| 5,862,316 A | * 1/1999 | Hagersten et al. | 395/182.13 |
| 6,144,901 A | * 11/2000 | Nickles et al. | 701/19 |

OTHER PUBLICATIONS

Raaphorst et al., "Automated fault–tree generation of operational fault–diagnosis," IEE Conference on Electric Railways in United Europe, pp. 173–177, Mar. 1995.

Netten et al., "Large–scale fault diagnosis for on–board train systems," Delft University of Technology, Faculty of Technical Mathematics and Informatics, Knowledge Based Systems Group. Julianallaan 132, 2628 BL Delft, The Netherlands; University of Wales Swansea, Department of Electrical and Electronic Engineering, Singleton Park, Swansea SA2 8PP, United Kingdom, pp. 67–76 (date unknown).

* cited by examiner

Primary Examiner—Paul P. Gordon
(74) Attorney, Agent, or Firm—Carl A. Rowold; Beusse Brownlee Bowdoin & Wolter PA; Enrique J. Mora

(57) ABSTRACT

The present invention discloses a system and method for analyzing fault log data from a malfunctioning machine. The system comprises a processor for receiving new fault log data comprising a plurality of faults from the malfunctioning machine and selecting a plurality of distinct faults from the new fault log data. The processor generates at least one distinct fault cluster from the selected plurality of distinct faults. Thereafter, the processor predicts at least one repair for at least one distinct fault cluster using a plurality of predetermined weighted repair and distinct fault cluster combinations.

24 Claims, 9 Drawing Sheets

| CUST | FLEET | RN | DWNLD DATE | TIME | HOURS | #FLTS |
|---|---|---|---|---|---|---|
| RR | | 1550 | 12/17/1998 | 05:49 | 104837.82 | 28 |

| OCCUR DATE | FAULT CODE | OCCUR HOURS | RESET HOURS | LOCO SPED | CC TH | ENG SPED | VOLT | MAIN AMPS | ALT FLD | WAT TMP | OIL TMP | L | L | FAULT DESCRIPTION |
|---|---|---|---|---|---|---|---|---|---|---|---|---|---|---|
| DEC-15 | 1111-01 | 104791.4 | 104791.4 | 0.1 | F 1 | 439 | 300 | 79 | | 168 | 189 | M | | PM3A+ OR IMC2-3,4,7 BAD |
| DEC-15 | 2222-01 | 104791.4 | 104791.4 | 0.1 | F 1 | 436 | 299 | 64 | | 168 | 189 | M | | PM3A+ OR IMC2-3,4,7 BAD |
| DEC-15 | 3333- | 104791.4 | 0.0 | 4.0 | F 1 | 436 | 399 | 362 | | 168 | 188 | M | | Fault Reset While In Lev |
| DEC-15 | 4444-04 | 104791.4 | 104791.4 | 4.9 | F 1 | 436 | 400 | 281 | | 168 | 188 | M | | PM3A+ OR IMC2-3,4,7 BAD |
| DEC-15 | 5555-0C | 104803.4 | 104803.5 | 0.0 | F 1 | 577 | 4 | 1 | | 163 | 168 | R | | INV1 PROPULSION SYSTEM FAULT |
| DEC-16 | 6666-0C | 104814.4 | 104814.5 | 0.0 | F 1 | 577 | 3 | 0 | | 168 | 170 | R | | INV2 PROPULSION SYSTEM FAULT |
| DEC-16 | 7777-02 | 104814.4 | 104814.4 | 0.0 | F 1 | 577 | 3 | 0 | | 168 | 170 | R | | PM3A+ OR IMC2-3,4,7 BAD |
| DEC-16 | 8888-04 | 104814.5 | 104817.0 | 0.0 | F 1 | 565 | 414 | 3 | | 168 | 170 | M | | PM3A+ OR IMC2-3,4,7 BAD |

| 7311 | 728F | 76D5 | 720F |
|------|------|------|------|

FIG. 5B

| 76D5 | 76D5 | 76D5 | 7311 | 7311 | 728F |
|------|------|------|------|------|------|
| 7311 | 728F | 720F | 728F | 720F | 720F |

FIG. 5C

| 76D5 | 76D5 | 76D5 | 7311 | 728F |
|------|------|------|------|------|
| 7311 | 7311 | 728F | 728F | 720F |
| 728F | 720F | 720F | 720F | 720F |

FIG. 5D

| 76D5 | 7311 | 728F | 720F |
|------|------|------|------|

FIG. 4

| 7311 | 24 |
|------|----|
| 728F | 2  |
| 76D5 | 1  |
| 720F | 1  |

250 ⟶

252    253       254        253      255
entered 1777 with 0.850 based on 1777 7311 728F 720F
entered 1766 with 0.850 based on 1766 7311 728F 720F
entered 1715 with 0.364 based on 1715 76D5 7311
entered 1677 with 0.300 based on 1677 7311 720F
storing 1777 with 0.300 based on 1777 7311 720F
storing 1766 with 0.300 based on 1766 7311 720F
storing 1777 with 0.300 based on 1777 7311 728F
storing 1677 with 0.300 based on 1677 7311 728F
storing 1766 with 0.300 based on 1766 7311 728F
entered 1745 with 0.280 based on 1745 76D5 728F 720F
entered 2323 with 0.273 based on 2323 76D5 7311
storing 1677 with 0.273 based on 1677 76D5 7311
storing 1715 with 0.211 based on 1715 7311
storing 1745 with 0.200 based on 1745 76D5 728F
storing 1745 with 0.184 based on 1745 76D5 720F
storing 2323 with 0.160 based on 2323 76D5
storing 1677 with 0.158 based on 1677 7311
storing 1777 with 0.158 based on 1777 7311
storing 1766 with 0.158 based on 1766 7311
storing 2323 with 0.158 based on 2323 7311
storing 1745 with 0.148 based on 1745 728F 720F
entered 1869 with 0.143 based on 1869 7311 728F 720F
storing 1745 with 0.130 based on 1745 728F
entered 2142 with 0.130 based on 2142 728F 720F
storing 1869 with 0.120 based on 1869 76D5 728F 720F
entered 1814 with 0.105 based on 1814 7311
storing 2142 with 0.103 based on 2142 720F
storing 2142 with 0.101 based on 2142 728F 260 ⟶
Number of distinct faults in current case is: 4

1766 - EFI                         matches 0.850
1777 - Pressure Pump               matches 0.850
1677 - Traction Problem            matches 1.031 cases:32
1745 - Locomotive Software Problem matches 0.943 cases:39
2323 - Engine Over Heated          matches 0.591 cases:71

FIG. 8

METHOD AND SYSTEM FOR ANALYZING FAULT LOG DATA FOR DIAGNOSTICS

BACKGROUND OF THE INVENTION

The present invention relates generally to machine diagnostics, and more specifically, to a system and method for processing historical repair data and fault log data for predicting one or more repairs from new fault log data from a malfunctioning machine.

A machine such as locomotive includes elaborate controls and sensors that generate faults when anomalous operating conditions of the locomotive are encountered. Typically, a field engineer will look at a fault log and determine whether a repair is necessary.

Approaches like neural networks, decision trees, etc., have been employed to learn over input data to provide prediction, classification, and function approximation capabilities in the context of diagnostics. Often, such approaches have required structured and relatively static and complete input data sets for learning, and have produced models that resist real-world interpretation.

Another approach, Case Based Reasoning (CBR), is based on the observation that experiential knowledge (memory of past experiences-or cases) is applicable to problem solving as learning rules or behaviors. CBR relies on relatively little pre-processing of raw knowledge, focusing instead on indexing, retrieval, reuse, and archival of cases. In the diagnostic context, a case refers to a problem/solution description pair that represents a diagnosis of a problem and an appropriate repair.

CBR assumes cases described by a fixed, known number of descriptive attributes. Conventional CBR systems assume a corpus of fully valid or "gold standard" cases that new incoming cases can be matched against.

U.S. Pat. No. 5,463,768 discloses an approach which uses error log data and assumes predefined cases with each case associating an input error log to a verified, unique diagnosis of a problem. In particular, a plurality of historical error logs are grouped into case sets of common malfunctions. From the group of case sets, common patterns, i.e., consecutive rows or strings of data, are labeled as a block. Blocks are used to characterize fault contribution for new error logs that are received in a diagnostic unit.

For a continuous fault code stream where any or all possible fault codes may occur from zero to any finite number of times and the fault codes may occur in any order, predefining the structure of a case is nearly impossible.

Therefore, there is a need for a system and method for analyzing new fault log data from a malfunctioning machine in which the system and method are not restricted to sequential occurrences of fault log entries, and wherein the system and method predict one or more repair actions using predetermined weighted repair and distinct fault cluster combinations.

SUMMARY OF THE INVENTION

The above-mentioned needs are met by the present invention which provides in one embodiment a system for analyzing fault log data from a malfunctioning machine. The system comprises receiving means for receiving new fault log data comprising a plurality of faults from the malfunctioning machine. Selecting means select a plurality of distinct faults from the new fault log data, and generating means generate at least one distinct fault cluster from the identified plurality of distinct faults. Thereafter, predicting means predict at least one repair for the at least one distinct fault cluster using a plurality of predetermined weighted repair and distinct fault cluster combinations.

The plurality of predetermined weighted repair and distinct fault cluster combinations may be determined by generating a plurality of cases from repair data and the fault log data. Each case comprises a repair and a plurality of distinct faults. Generating means generate, for each of the plurality of cases, at least one repair and distinct fault cluster combination, and assigning means assign, to each of the repair and distinct fault cluster combinations, a weight, wherein the assigned weights are determined by dividing the number of times the combination occurs in cases comprising related repairs by the number of times the combination occurs in the plurality of cases.

The system may also provide analysis of a stream of fault log data or daily download of fault log data having a plurality of faults occurring over a predetermined period of time from the malfunctioning machine. The system may further include means for determining at least one of a completed repair and a prior recommended repair occurring during the predetermined period of time. First selecting means selects a portion of the new fault log data which occurs after the at least one of the completed repair and the prior predicted repair. Second selecting means select a plurality of distinct faults from the selected portion of the fault log data, generating means generate at least one distinct fault cluster from the selected plurality of distinct faults, and predicting means predict at least one repair for the at least one distinct fault cluster using a plurality of predetermined weighted repair and distinct fault cluster combinations.

BRIEF DESCRIPTION OF THE DRAWINGS

FIG. 2 is an illustration of a portion of new fault log data from a malfunctioning machine;

FIG. 4 is an illustration of the distinct faults identified in the new fault log, shown in FIG. 2, and the number of occurrences thereof;

FIGS. 5A–5D are illustrations of distinct fault clusters for the distinct faults identified in FIG. 4;

FIG. 8 is a printout of weighted repair and fault cluster combinations by the system shown in FIG. 1 for the fault log shown in FIG. 2, and a listing of recommended repairs;

DETAILED DESCRIPTION OF THE INVENTION

Figure 1:
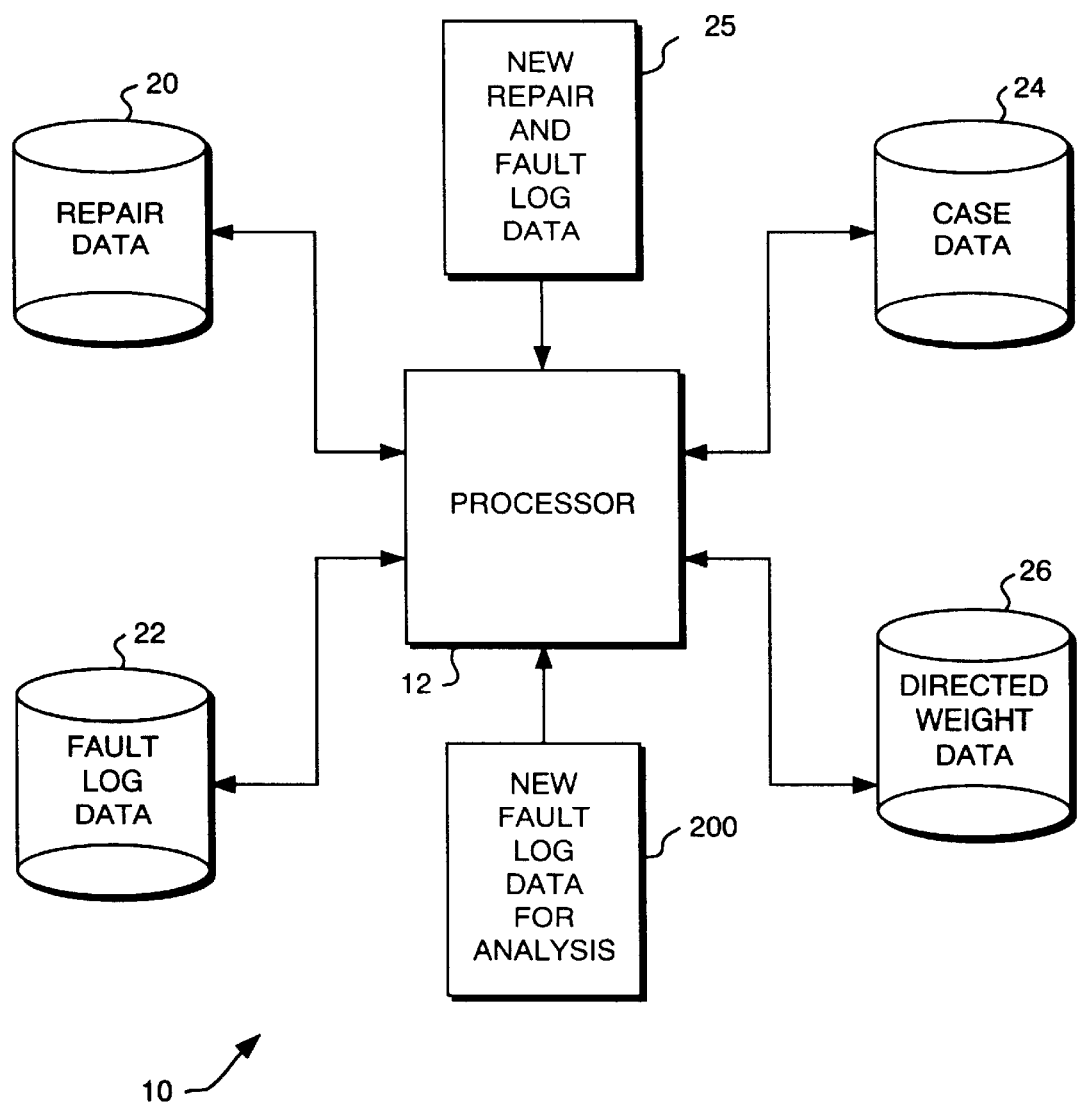
FIG. 1 is one embodiment of a block diagram of a system of the present invention for automatically processing repair data and fault log data from one or more machines and diagnosing a malfunctioning machine.

FIG. 1 diagrammatically illustrates one embodiment of a system 10 of the present invention. In one aspect, system 10 provides automated analysis of fault log data, from a malfunctioning machine such as a locomotive, and prediction of one or more possible repair actions.

Although the present invention is described with reference to a locomotive, system 10 can be used in conjunction with any machine in which operation of the machine is monitored, such as a chemical, an electronic, a mechanical, or a microprocessor machine.

Exemplary system 10 includes a processor 12 such as a computer (e.g., UNIX workstation) having a hard drive, input devices such as a keyboard, a mouse, magnetic storage media (e.g., tape cartridges or disks), optical storage media (e.g., CD-ROMs), and output devices such as a display and a printer. Processor 12 is operably connected to a repair data storage unit 20, a fault log data storage unit 22, a case data storage unit 24, and a directed weight data storage unit 26.

Processor 12 is also operable to receive new fault log data 200 for analysis thereof. FIG. 2 shows in greater detail an exemplary portion 220 of the new fault log data 200 which may include a customer identification number 222, a locomotive identification number or unit 224, the dates 225 the faults occurred, the fault codes 226, and a fault code description 228. Additional information may also include various sensor readings, e.g., temperature sensor readings, pressure sensor readings, electrical sensor readings, engine power readings, etc. Desirably, the new fault log data includes faults occurring over a predetermined period of time prior such as a predetermined number of days (e.g., 14 days). It will be appreciated that other suitable time periods may be chosen. Advantageously, as explained below, the period of time corresponds to the period of time used for predetermining weighted repair and distinct fault cluster combinations.

Figure 3:
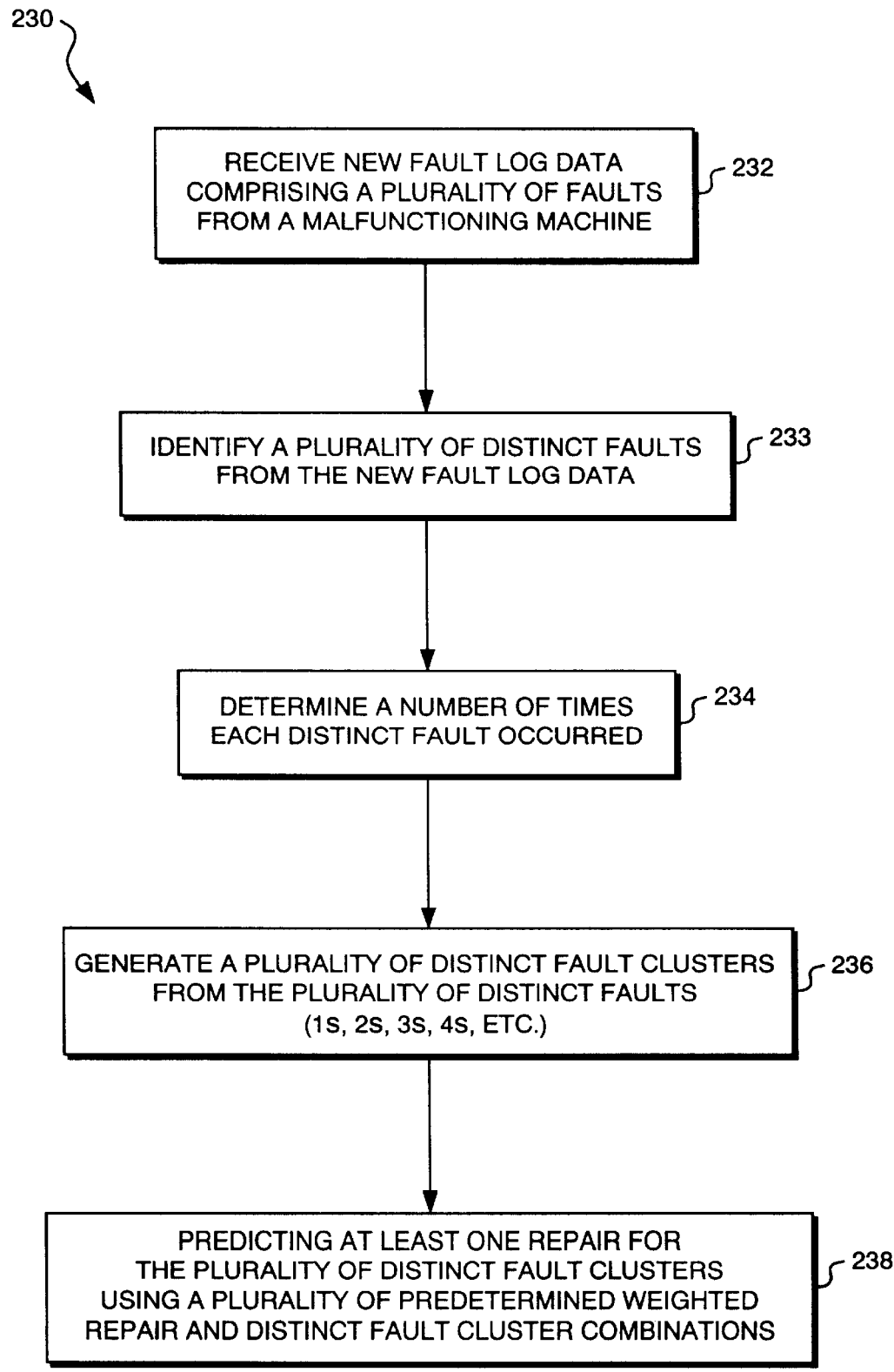
FIG. 3 is a flowchart describing the steps for analyzing the new fault log data from a malfunctioning machine and predicting one or more possible repair actions.

FIG. 3 is a flowchart which generally describes the steps for analyzing new fault log data 200 (FIG. 1). As shown in FIG. 3 at 232, the new fault log data comprising a plurality of faults from a malfunctioning machine is received. At 233, a plurality of distinct faults from the new fault log data is identified, and at 234, the number of times each distinct fault occurred in the new fault log data is determined. As used herein, the term "distinct fault" is a fault or a fault code which differs from other faults or fault codes so that, as described in greater detail below, if a portion of the fault log data includes more than one occurrence of the same fault or fault code, the similar faults or fault codes are identified only once. As will become apparent from the discussion below, it is the selection of distinct faults which is important and not the order or sequence of their arrangement in the fault log data.

FIG. 4 shows the plurality of distinct faults and the number of times in which each distinct fault occurred for fault log 220 (FIG. 2). In this example, fault code 7311 represents a phase module malfunction which occurred 24 times, fault code 728F indicates an inverter propulsion malfunction which occurred twice, fault code 76D5 indicates a fault reset which occurred once, and fault code 720F indicates an inverter propulsion malfunction which occurred once.

With reference again to FIG. 3, a plurality of fault clusters is generated for the distinct faults at 236. FIGS. 5A–5D illustrate the distinct fault clusters generated from the distinct faults extracted from fault log data 200. Four single fault clusters (e.g., fault code 7311, fault code 728F, fault code 76D5, and fault code 720F) are illustrated in FIG. 5A. Six double fault clusters (e.g., fault codes 76D5 and 7311, fault codes 76D5 and 728F, fault codes 76D5 and 720F, fault codes 7311 and 728F, fault codes 7311 and 720F, and fault codes 728F and 720F) are illustrated in FIG. 5B. Four triple fault clusters (e.g., fault codes 76D5, 7311, and 728F), fault codes 76D5, 7311, and 720F, fault codes 76D5, 728F, and 720F, and fault codes 7311, 728F, and 720F) are illustrated in FIG. 5C, and one quadruple fault cluster (e.g., 76D5, 7311, 728F, and 720F) is illustrated in FIG. 5D.

From the present description, it will be appreciated by those skilled in the art that a fault log having a greater number of distinct faults would result in a greater number of distinct fault clusters (e.g., ones, twos, threes, fours, fives, etc.).

At 238, at least one repair is predicted for the plurality of fault clusters using a plurality of predetermined weighted repair and fault cluster combinations. The plurality of predetermined weighted repair and fault cluster combinations may be generated as follows.

With reference again to FIG. 1, processor 12 is desirably operable to process historical repair data contained in a repair data storage unit 20 and historical fault log data contained in a fault log data storage unit 22 regarding one or more locomotives.

For example, repair data storage unit 20 includes repair data or records regarding a plurality of related and unrelated repairs for one or more locomotives. Fault log data storage unit 22 includes fault log data or records regarding a plurality of faults occurring for one or more locomotives.

Figure 6:
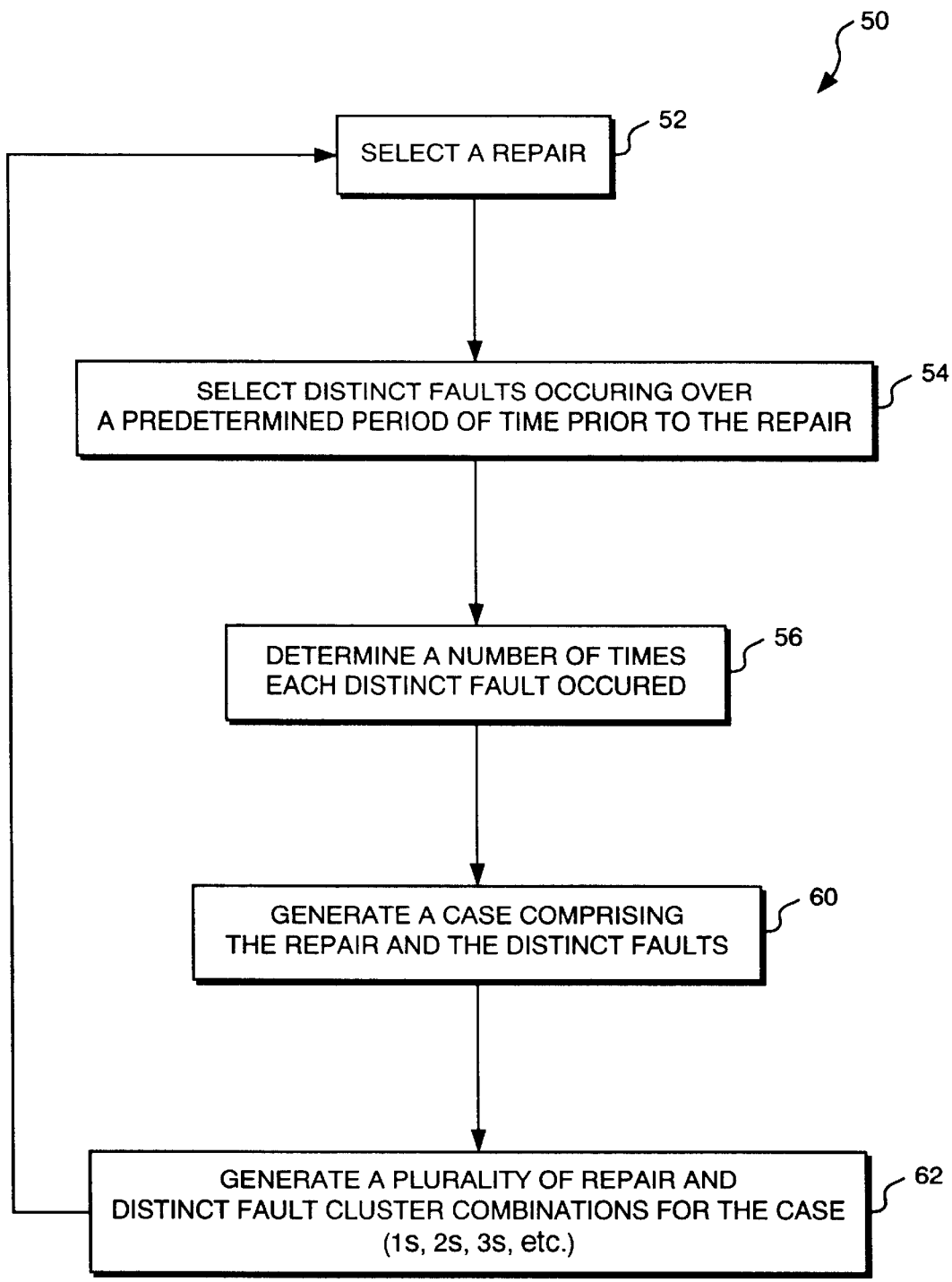
FIG. 6 is a flowchart describing the steps for generating a plurality of predetermined cases, and predetermined repair and fault cluster combinations for each case.

FIG. 6 is a flowchart of an exemplary process 50 of the present invention for selecting or extracting repair data from repair data storage unit 20 and fault log data from the fault log data storage unit 22 and generating a plurality of cases, and repair and fault cluster combinations.

Exemplary process 50 comprises, at 52, selecting or extracting a repair from repair data storage unit 20 (FIG. 1). Given the identification of a repair, the present invention searches fault log data storage unit 22 (FIG. 1) to select or extract faults occurring over a predetermined period of time prior to the repair, at 54. At 56, the number of times each distinct fault occurred during the period of time is determined.

A repair and corresponding distinct faults are summarized and stored as a case, at 60. For each case, a plurality of repair and fault cluster combinations are generated at 62 (in a similar manner as described for the new fault log data).

Process 50 is repeated by selecting another repair entry from repair data to generate another case, and to generate a plurality of repair and fault cluster combinations. Case data storage unit 24 desirably comprises a plurality of cases comprising related and unrelated repairs.

Figure 7:
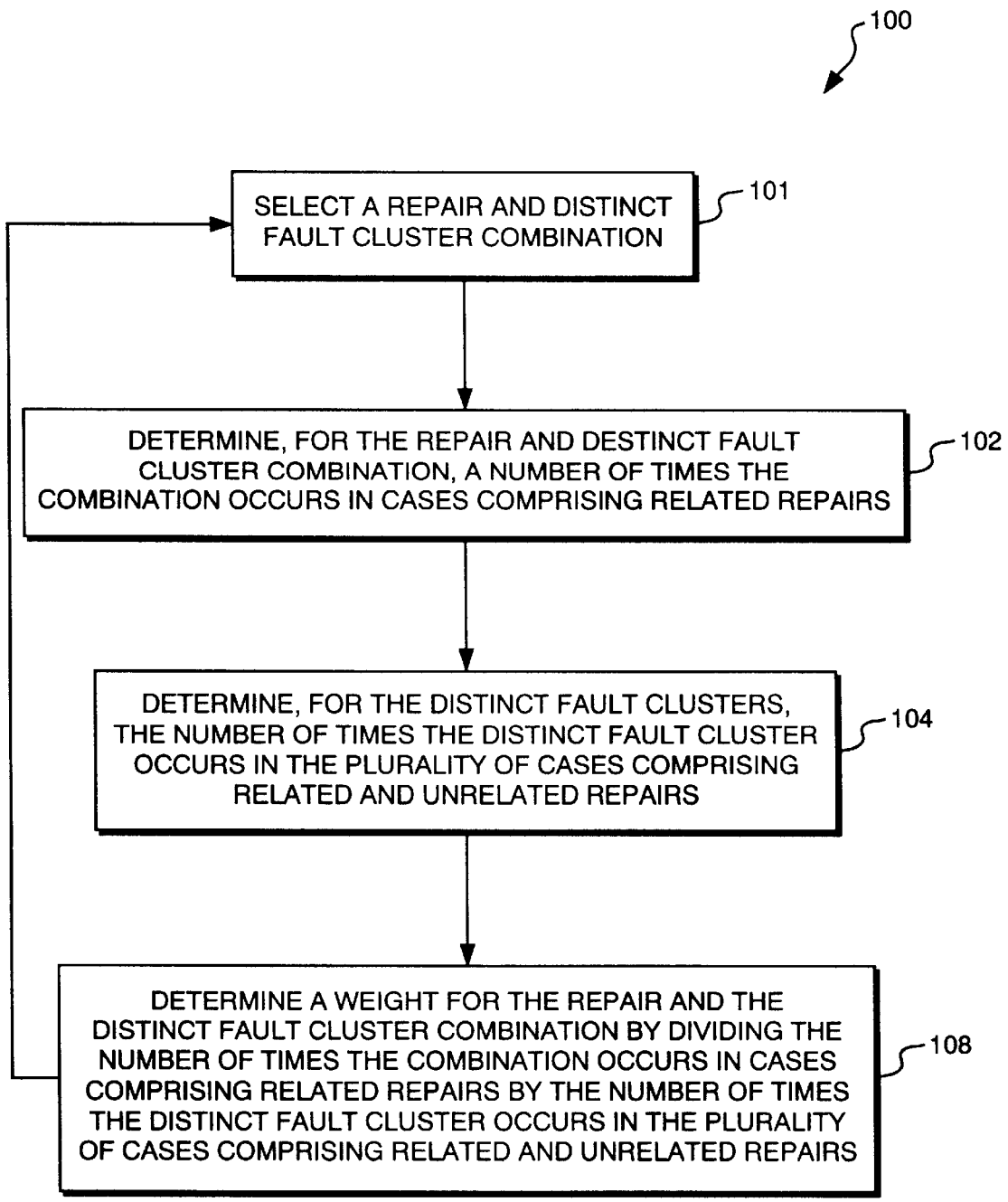
FIG. 7 is a flowchart describing the steps for determining predetermined weighted repair and fault cluster combinations.

FIG. 7 is a flowchart of an exemplary process 100 of the present invention for generating weighted repair and fault cluster combinations based on the puerility of cases generated in process 50. Process 100 comprises, at 101, selecting a repair and fault cluster combination, and determining, at 102, the number of times the combination occurs for related repairs. The number of times the combination occurs in the plurality of cases of related and unrelated repairs, e.g., all repairs for similar locomotives, is determined at 104. A weight is determined at 108 for the repair and distinct fault cluster combination by dividing the number of times the distinct fault cluster occurs in related cases by the number of times the distinct fault cluster occurs in all, e.g., related and unrelated cases, and the weighted repair and distinct fault cluster combination is desirably stored in a directed weight data storage unit 26.

Process 50 and 100 are further described in greater detail in application Ser. No. 09/285,612, entitled "Method And System For Processing Repair Data And Fault Log Data To Facilitate Diagnostics," (Attorney Docket No. RD-26,576) the subject matter of which is incorporated by reference herein in its entirety.

FIG. 8 illustrates a printout 250 of the results generated by system 10 (FIG. 1) for fault log 200 (FIG. 1), in which in a top portion 252, a plurality of corresponding repairs 253, assigned weights 254, and fault clusters 255 are presented. As shown in a bottom portion 260 of printout 250, five recommendations for likely repairs actions are presented for review by a field engineer.

Figure 9:
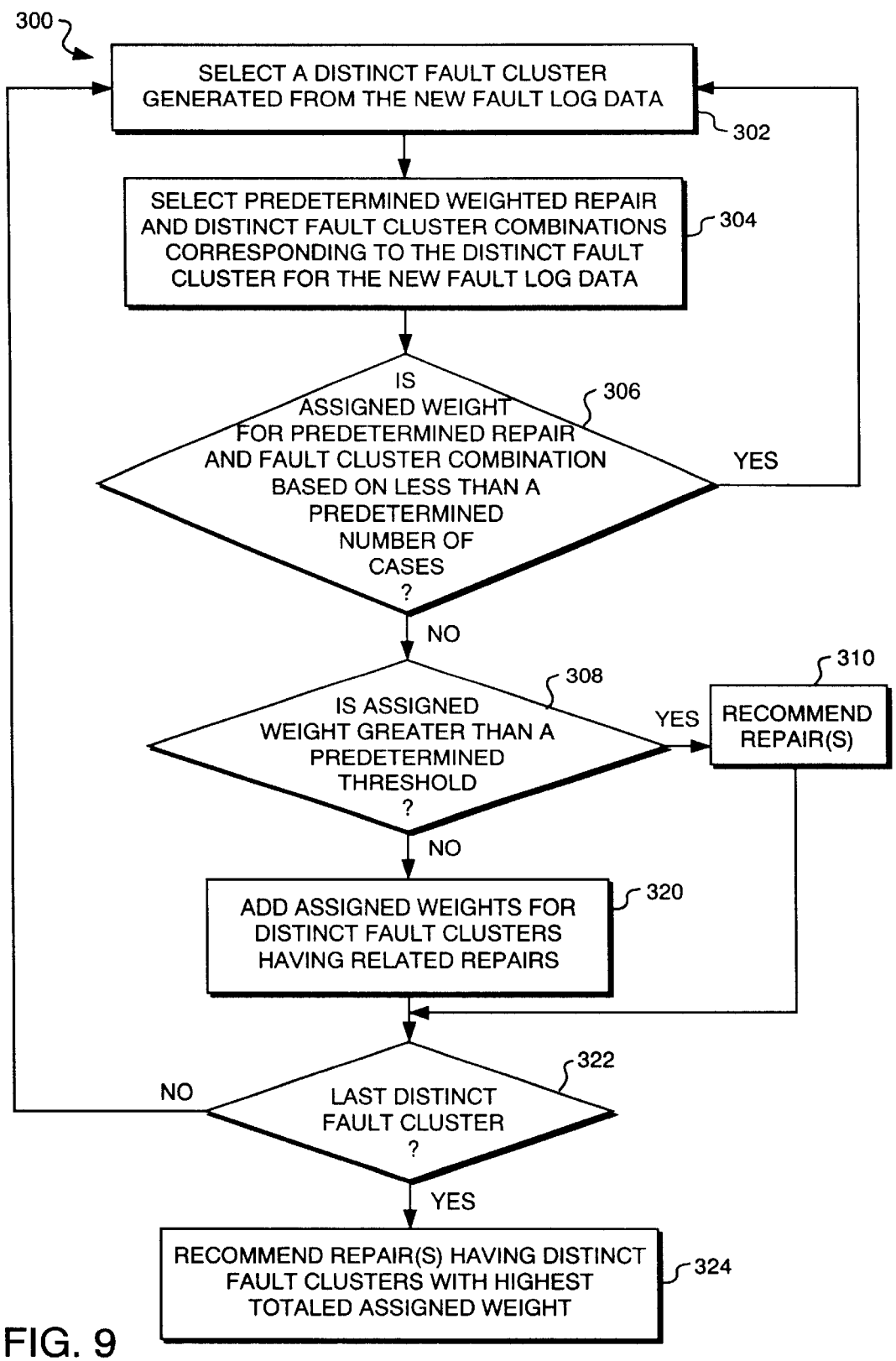
FIG. 9 is a flowchart further describing the step of predicting repairs from the weighted repair and fault cluster combinations shown in FIG. 8.

FIG. 9 is a flowchart of an exemplary process 300 for determining and presenting the top most likely repair candidates which may include repairs derived from predetermined weighted repair and distinct fault cluster combinations having the greatest assigned weighted values or repairs which are determined by adding together the assigned weighted values for fault clusters for related repairs.

As shown in FIG. 9, initially, a distinct fault cluster generated from the new fault log data is selected at 302. At 304, predetermined repair(s) and assigned weight(s) corresponding to the distinct fault cluster are selected from directed weight storage unit 26 (FIG. 1).

At 306, if the assigned weight for the predetermined weighted repair and fault cluster combination is determined by a plurality of cases for related and unrelated repairs which number less than a predetermined number, e.g., 5, the fault cluster is excluded and the next distinct fault cluster is selected at 302. This prevents weighted repair and fault cluster combinations which are determined from only a few cases from having the same effect in the prediction of repairs as weighted repair and fault cluster combinations determined from many cases.

If the number of cases is greater than the predetermined minimum number of cases, at 308, a determination is made as to whether the assigned value is greater than a threshold value, e.g., 0.70 or 70%. If so, the repair is displayed at 310. If the fault cluster is not the last fault cluster to be analyzed at 322, the next distinct fault cluster is selected at 302 and the process is repeated.

If the assigned weight for the predetermined weighted repair and fault cluster combination is less than the predetermined threshold value, the assigned weights for related repairs are added together at 320. Desirably, up to a maximum number of assigned weights, e.g., 5, are used and added together. After selecting and analyzing the distinct fault clusters generated from the new fault log data, the repairs having the highest added assigned weights for fault clusters for related repairs are displayed at 324.

With reference again to FIG. 8, repairs corresponding to the weighted repair and fault cluster combinations in which the assigned weights are greater than the threshold value are presented first. As shown in FIG. 8, repair codes 1766 and 1777 and distinct fault cluster combinations 7311, 728F, and 720F, have an assigned weight of 85% and indicate a recommended replacement of the EFI.

As also shown in FIG. 8, repairs for various fault clusters having the highest added or total weight are presented next. For example, repair code 1677 which corresponds to a traction problem has a totaled assigned weight of 1.031, repair code 1745 which corresponds to a locomotive software problem has a totaled assigned weight of 0.943, and repair code 2323 which corresponds to an overheated engine has a totaled assigned weight of 0.591.

Advantageously, the top five most likely repair actions are determined and presented for review by a field engineer. For example, up to five repairs having the greatest assigned weights over the threshold value are presented. When there is less than five repairs which satisfy the threshold, the remainder of recommended repairs are presented based on a total assigned weight.

Desirably the new fault log data is initially compared to a prior fault log data from the malfunctioning locomotive. This allows determination whether there is a change in the fault log data over time. For example, if there is no change, e.g., no new faults, then it may not be necessary to process the new fault log data further.

Figure 10:
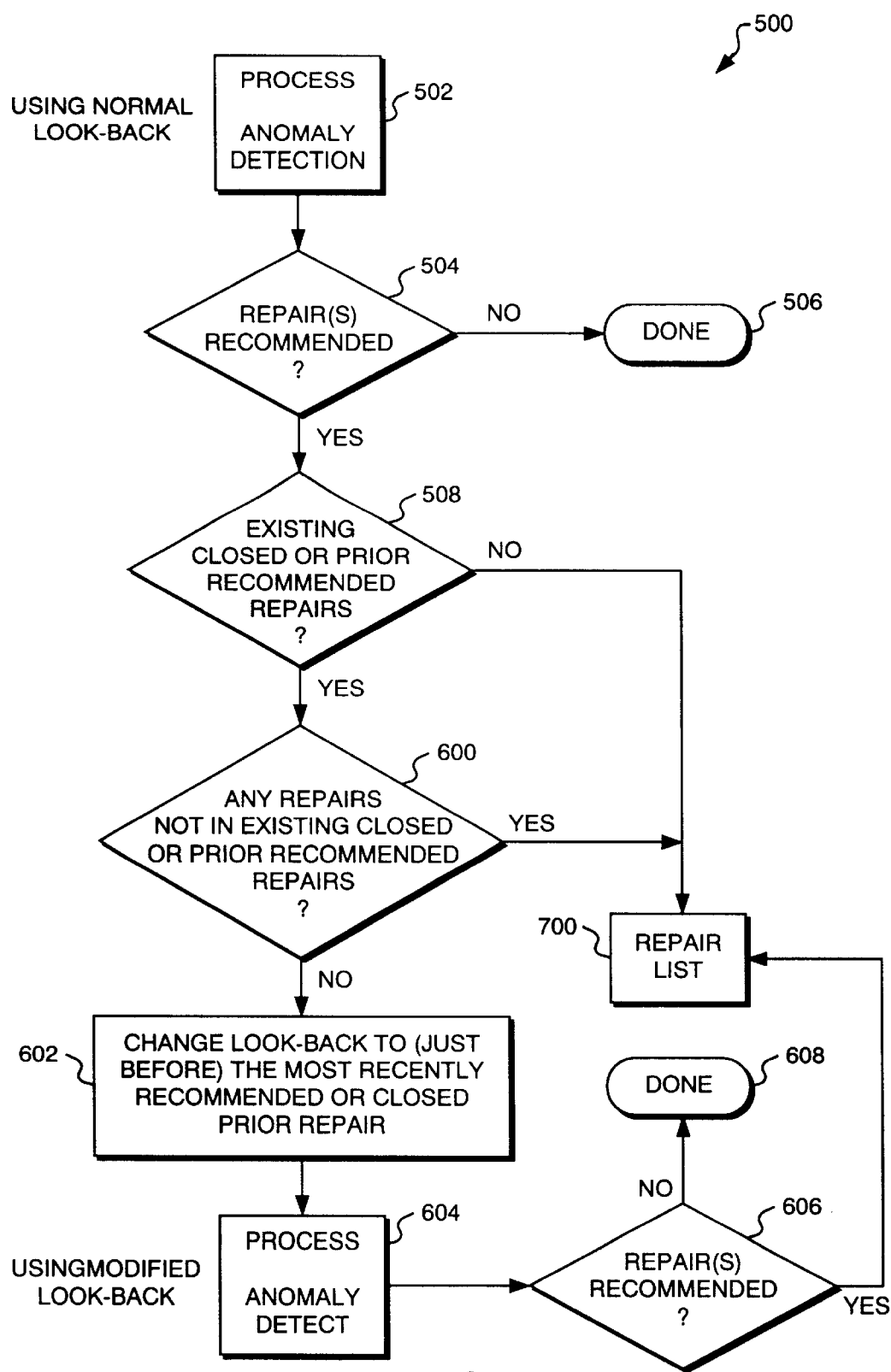
FIG. 10 is one embodiment of a flowchart describing the steps for automatically analyzing new fault log data from a malfunctioning machine and predicting one or more possible repair actions.

FIG. 10 illustrates a flowchart of an exemplary automated process 500 for analyzing fault log data from a locomotive, e.g., new fault log data which is generated every day, using system 10. In particular, process 500 accommodates the situation where a prior repair is undertaken or a prior repair is recommended within the predetermined period of time over which the fault log data is analyzed. This avoids recommending the same repair which has been previously recommended and/or repaired.

At 502, new fault log data is received which includes faults occurring over a predetermined period of time, e.g., 14 days. The fault log data is analyzed, for example as described above, generating distinct fault clusters and comparing the generated fault clusters to predetermined weighted repair and fault cluster combinations.

At 504, the analysis process may use a thresholding process described above to determine whether any repairs are recommended (e.g., having a weighted value over 70%). If no repairs are recommended, the process is ended at 506. The process is desirably repeated again with a download of new fault log data the next day.

If a repair recommendation is made, existing closed (e.g., performed or completed repairs) or prior recommended repairs which have occurred within the predetermined period of time are determined at 508. For example, existing closed or prior recommended repairs may be stored and retrieved from repair data storage unit 20. If there are no existing or recommended repairs than all the recommended repairs at 504 are listed in a repair list at 700.

If there are existing closed or prior recommended repairs, then at 600, any repairs not in the existing closed or prior recommended repairs are listed in the repair list at 700.

For repairs which are in the existing closed or prior recommended repairs, at 602, the look-back period (e.g., the number of days over which the faults are chosen) is revised. Using the modified look-back or shortened period of time, the modified fault log data is analyzed at 604, as described above, using distinct fault clusters, and comparing the generated fault clusters to predetermined weighted repair and fault cluster combinations.

At 606, the analysis process may use the thresholding process described above to determine whether any repairs are recommended (e.g., having a weighted value over 70%). If no repairs are recommended, the process is ended at 608 until the process is stated again with a new fault log data from the next day, or if a repair is recommended it is added to the repair list at 700.

From the present description, it will be appreciated by those skilled in the art that other processes and methods, e.g., different thresholding values or fault log data analysis which does not use distinct fault clusters, may be employed in predicting repairs from the new fault log data according to process 500 which takes into account prior performed repairs or prior recommended repairs.

Thus, the present invention provides in one aspect a method and system for processing a new fault log which is not restricted to sequential occurrences of faults or error log entries. In another aspect, the calibration of the diagnostic significance of fault clusters is based upon cases of related repairs and cases for all the repairs.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method for analyzing fault log data from a malfunctioning machine, comprising:
   receiving new fault log data comprising a plurality of faults from the malfunctioning machine;
   selecting a plurality of distinct faults from the new fault log data;
   generating at least one distinct fault cluster from the plurality of distinct faults; and
   predicting at least one repair for the at least one distinct fault cluster using a plurality of predetermined weighted repair and distinct fault cluster combinations.

2. The method of claim 1 wherein the at least one distinct fault cluster comprises at least one of a single distinct fault and a plurality of distinct faults.

3. The method of claim 1 wherein the at least one distinct fault cluster comprises a plurality of distinct faults.

4. The method of claim 1 wherein each of the plurality of predetermined weighted repair and distinct fault cluster combinations are generated from a plurality of cases, each case comprising a repair and plurality of distinct faults, and each of the plurality of predetermined weighted repair and distinct fault cluster combinations being assigned a weight determined by dividing the number of times the combination occurs in cases comprising related repairs by the number of times the combination occurs in the plurality of cases.

5. The method of claim 4 further comprising excluding at least one predetermined weighted repair and distinct fault cluster combination in which the assigned weight is determined by related cases which number less than a predetermined number.

6. The method of claim 4 wherein predicting the at least one repair comprises selecting at least one repair using a predetermined weighted repair and distinct fault cluster combination having an assigned weight which is greater than a predetermined threshold value.

7. The method of claim 4 wherein predicting the at least one repair comprises selecting at least one repair using the plurality of predetermined weighted repair and fault cluster combinations and adding assigned weights for distinct fault clusters for related repairs.

8. The method of claim 1 further comprising generating a plurality of predetermined weighted repair and distinct fault cluster combinations from repair data comprising a plurality of repairs and fault log data comprising a plurality of faults.

9. The method of claim 8 wherein the generating a plurality of predetermined weighted repair and distinct fault cluster combinations comprises;
   generating a plurality of cases from repair data and the fault log data, each case comprising a repair and a plurality of distinct faults;
   generating, for each of the plurality of cases, at least one repair and distinct fault cluster combination; and
   assigning, to each of the repair and distinct fault cluster combinations, a weight, wherein the assigned weight comprises dividing the number of times the combination occurs in cases comprising related repairs by the number of times the combination occurs in the plurality of cases.

10. The method of claim 1 further comprising comparing the new fault log data to a prior fault log data.

11. The method of claim 1 wherein the new fault log data comprises a plurality of faults occurring over a predetermined period of time from the malfunctioning machine, and further comprising:
    determining at least one of a completed repair and a prior recommended repair occurring during the predetermined period of time;
    selecting a portion of the new fault log data which occurs after the at least one of a completed repair and a prior predicted repair;
    selecting a plurality of distinct faults from the selected portion of the fault log data;
    generating at least one distinct fault cluster from the selected plurality of distinct faults from the selected portion of the fault log data; and
    predicting at least one repair for the at least one distinct fault cluster from the selected portion of the fault log data using a plurality of predetermined weighted repair and distinct fault cluster combinations.

12. A system for analyzing fault log data from a malfunctioning machine, comprising:
    means for receiving new fault log data comprising a plurality of faults from the malfunctioning machine;
    means for selecting a plurality of distinct faults from the new fault log data;
    means for generating at least one distinct fault cluster from the plurality of distinct faults; and
    means for predicting at least one repair for the at least one distinct fault cluster using a plurality of predetermined weighted repair and distinct fault cluster combinations.

13. The system of claim 12 wherein the at least one distinct fault cluster comprises at least one of a single distinct fault and a plurality of distinct faults.

14. The system of claim 12 wherein the at least one distinct fault cluster comprises a plurality of distinct faults.

15. The system of claim 12 wherein each of the plurality of predetermined weighted repair and distinct fault cluster combinations are generated from a plurality of cases, each case comprising a repair and plurality of distinct faults, and each of the plurality of predetermined weighted repair and distinct fault cluster combinations being assigned a weight determined by dividing the number of times the combination occurs in cases comprising related repairs by the number of times the combination occurs in the plurality of cases.

16. The system of claim 15 further comprising means for excluding predetermined weighted repair and distinct fault cluster combinations in which the assigned weight is determined by related cases which number less than a predetermined number.

17. The system of claim 15 wherein predicting the at least one repair comprises means for selecting at least one repair using a predetermined weighted repair and distinct fault cluster combination having an assigned weight which is greater than a predetermined threshold value.

18. The system of claim 15 wherein predicting the at least one repair comprises means for selecting at least one repair using the plurality of predetermined weighted repair and fault cluster combinations and adding assigned weights for distinct fault clusters for related repairs.

19. The system of claim 12 further comprising means for generating a plurality of predetermined weighted repair and distinct fault cluster combinations from repair data comprising a plurality of repairs and fault log data comprising a plurality of faults.

20. The system of claim 19 wherein the means for generating a plurality of predetermined weighted repair and distinct fault cluster combinations comprises:

means for generating a plurality of cases from repair data and the fault log data, each case comprising a repair and a plurality of distinct faults;

means for generating, for each of the plurality of cases, at least one repair and distinct fault cluster combination; and means for assigning, to each of the repair and distinct fault cluster combinations, a weight, wherein the assigned weight comprises dividing the number of times the combination occurs in cases comprising related repairs by the number of times the combination occurs in the plurality of cases.

21. The system of claim 12 further comprising means for comparing the new fault log data to a prior fault log data.

22. The system of claim 12 wherein the new fault log data comprises a plurality of faults occurring over a predetermined period of time from the malfunctioning machine, and further comprising:

means for determining at least one of a completed repair and a prior recommended repair occurring during the predetermined period of time;

means for selecting a portion of the new fault log data which occurs after the at least one of a completed repair and a prior predicted repair;

means for selecting a plurality of distinct faults from the selected portion of the fault log data;

means for generating at least one distinct fault cluster from the selected plurality of distinct faults from the selected portion of the fault log data; and means for predicting at least one repair for the at least one distinct fault cluster from the selected portion of the fault log data using a plurality of predetermined weighted repair and distinct fault cluster combinations.

23. A system for analyzing fault log data from a malfunctioning machine, comprising:

a directed weight data storage unit adapted to store a plurality of weighted repair and distinct fault cluster combinations;

a processor adapted to receive new fault log data comprising a plurality of faults from the malfunctioning machine;

the processor adapted to select a plurality of distinct faults from the new fault log data;

the processor adapted to generate at least one distinct fault cluster from the selected plurality of distinct faults; and the processor adapted to predict at least one repair for the at least one distinct fault cluster using the plurality of predetermined weighted repair and distinct fault cluster combinations.

24. An article of manufacture comprising:

a computer program product comprising computer usable medium having computer readable program code means embodied therein for causing the analysis of fault log data from a malfunctioning machine, the computer readable program code means in said article of manufacture comprising:

computer readable program code means for causing a computer to receive new fault log data comprising a plurality of faults from the malfunctioning machine;

computer readable program code means for causing a computer to identify a plurality of distinct faults from the new fault log data;

computer readable program code means for causing a computer to generate at least one distinct fault cluster from the identified plurality of distinct faults; and computer readable program code means for causing a computer to predict at least one repair for the at least one distinct fault cluster using a plurality of predetermined weighted repair and distinct fault cluster combinations.

\* \* \* \* \*